United States Patent [19]

Bailey et al.

[11] Patent Number: 4,924,087
[45] Date of Patent: May 8, 1990

[54] OPTIC FIBER BUFFER DEFECT DETECTION SYSTEM

[75] Inventors: Wilbur M. Bailey; George H. Hulderman, both of Tucson, Ariz.; Vincent L. Jones, Simi Valley, Calif.; Joseph L. Pikulski, Westlake, Calif.; Arlie G. Standlee, Thousand Oaks, Calif.; Gregory L. Tangonan, Oxnard, Calif.; Michael R. Vince, Thousand Oaks, Calif.; Joseph A. Wysocki, Oxnard, Calif.

[73] Assignee: Hughes Aircraft Company, Los Angeles, Calif.

[21] Appl. No.: 286,444

[22] Filed: Dec. 19, 1988

[51] Int. Cl.$^5$ ................................................ H01J 5/16
[52] U.S. Cl. .................................. 356/73.1; 250/572; 250/227.31; 250/227.29; 356/73.1
[58] Field of Search ....................... 250/227, 571, 572; 356/73.1, 238, 239, 354, 430

[56] References Cited

U.S. PATENT DOCUMENTS

| | | | |
|---|---|---|---|
| 3,777,171 | 12/1973 | Hollenbeck | 356/239 |
| 3,980,890 | 9/1976 | Heckrodt et al. | 356/239 |
| 4,007,992 | 2/1977 | Petrohilos et al. | 356/430 |
| 4,021,217 | 5/1977 | Bondybey et al. | 356/430 |
| 4,139,306 | 2/1979 | Novton | 356/430 |
| 4,168,907 | 9/1979 | Presby | 356/239 |
| 4,358,202 | 11/1982 | Puffer et al. | 356/430 |
| 4,563,095 | 1/1986 | Puffer | 356/430 |
| 4,583,851 | 4/1986 | Yataki | 356/73.1 |
| 4,678,327 | 7/1987 | Yoshida et al. | 356/73.1 |

Primary Examiner—David C. Nelms
Assistant Examiner—Stephone B. Allen
Attorney, Agent, or Firm—P. M. Coble; W. K. Denson-Low

[57] ABSTRACT

A fiber optic buffer defect detection system including a laser, for illuminating the fiber buffer with a collimated beam of light energy, and detectors for detecting any scattering of the beam, from a defect in the fiber buffer. The detectors are mounted to collect scattering out of a radial plane defined by the angular rotation of the beam about the fiber at the point of intersection of the beam with the fiber buffer.

16 Claims, 2 Drawing Sheets

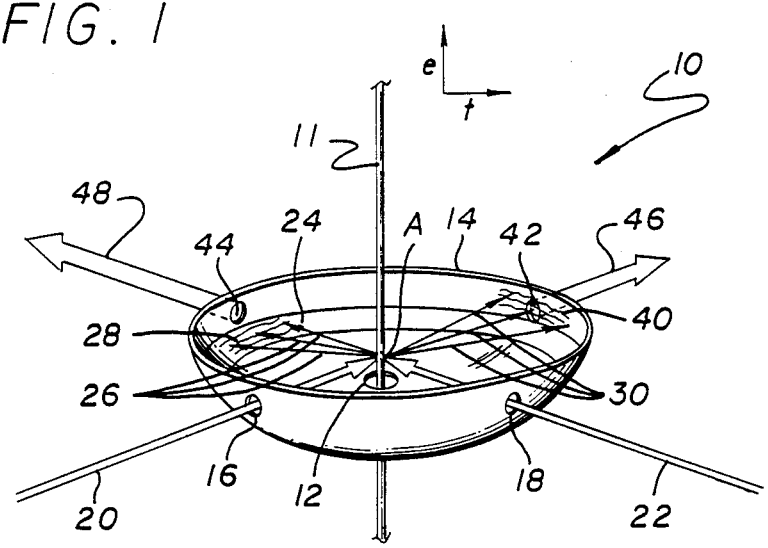
FIG. 1
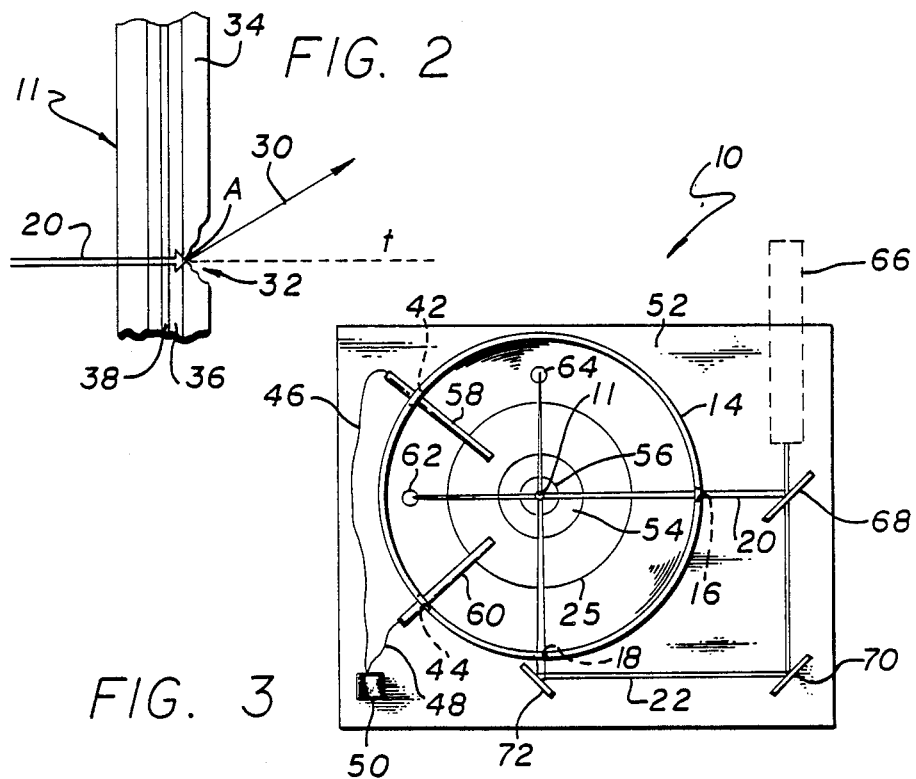
FIG. 2
FIG. 3

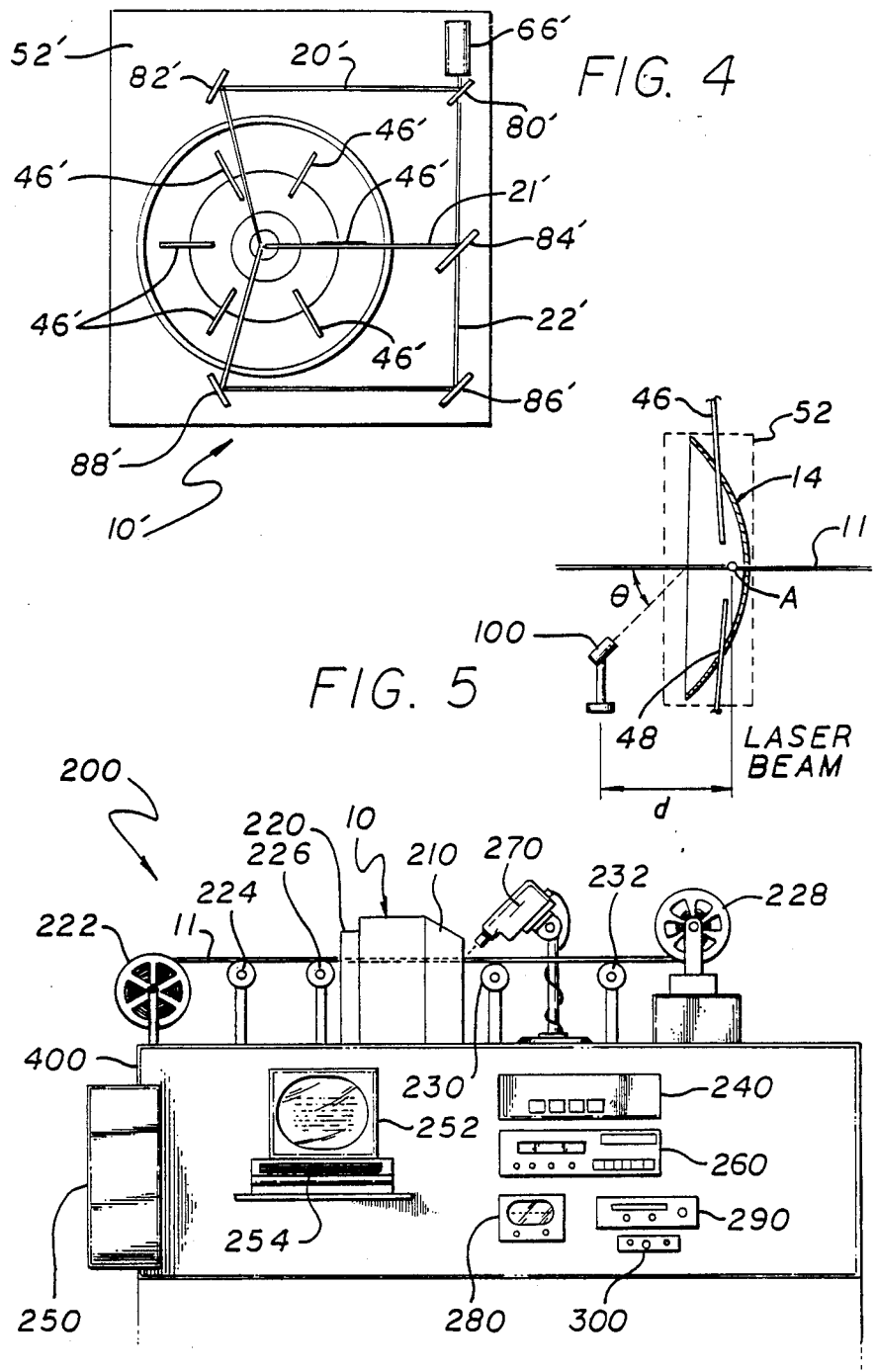

OPTIC FIBER BUFFER DEFECT DETECTION SYSTEM

BACKGROUND OF THE INVENTION

1. Field of the Invention

The present invention relates to the manufacture and test of optical fibers. More specifically, the present invention relates to systems for detecting inconsistencies in organic buffers on optical fibers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

As is known in the art, optical fibers typically have a glass filament core (comprised of a cladding surrounding a wave guiding core) which is surrounded by a protective sheath of organic material. Commonly referred to as the "buffer layer", this sheath often has bubbles, breaks, scratches and other nonuniformities which occur as a result of the fabrication and/or handling of the fiber. For most communication applications, such nonuniformities in the buffer layer have heretofore been thought to be eliminated. However, certain fiber optic applications place significant demands on the tensile strength of the fiber optic. One such stressful application is in the deployment of fiber during the flight of a fiber optic guided missile. In this case, the fiber may be stressed at levels approaching its intrinsic strength. Pre-existing defects in the coating may have permitted mechanical contact with the glass fiber. This could weaken the fiber such that it would be likely to break at stresses lower than the mechanical proof stress. The mechanical proof stress is estimated to be large enough to insure successful fiber payout.

Hence, a detailed inspection of the fiber is critical to assure the survivability of the fiber. Currently, this inspection is only performed manually with a microscope on the fiber ends. Unfortunately, with missile fiber lengths being on the order of tens of kilometers, this process is inadequate. Further, the inspection may have to be repeated to guarantee a rigorous control of fiber quality after handling and/or shipping.

Thus, there is a need in the art for a fast, inexpensive technique for inspecting the protective buffer on long lengths of optical fiber for defects and flaws.

SUMMARY OF THE INVENTION

The need in the art is addressed by the fiber optic buffer inspection system of the present invention. The system of the invention includes a light source, for illuminating the fiber and buffer with a beam of light energy, and detectors for detecting any scattering of the beam, from a defect in the fiber optic buffer. The detectors are mounted to collect scattering out of a radial plane defined by the angular rotation of the beam about the fiber at the point of intersection of the beam with the fiber and buffer.

BRIEF DESCRIPTION OF THE INVENTION

FIG. 1 is a simplified diagrammatic perspective view of the system of the present invention which illustrates the principles thereof.

FIG. 2 shows a representation of a portion of a typical optical fiber with a defect in the buffer coating.

FIG. 3 shows a top view of the illustrative embodiment of the defect detection system 10 of the present invention.

FIG. 4 shows an alternative embodiment of the defect detection system 10 of the present invention.

FIG. 5 illustrates yet another alternative embodiment of the defect detection system of the present invention.

FIG. 6 shows an illustrative complete optical fiber inspection system utilizing the principles of the present invention.

DESCRIPTION OF THE INVENTION

The present invention provides a novel approach to the testing of the quality of the buffer coating of optical fibers. The technique of the present invention is sensitive to coating discontinuities such as bubbles or breaks in the coating induced, during the manufacturing or handling of the fiber. The invention utilizes simple laser diffraction optics. The fiber under inspection is illuminated by the laser beam. Defects in the fiber coating cause changes in the diffraction pattern. These changes are detected and correlated with the defect. In the preferred embodiment of the present invention, the laser is incident perpendicular to the fiber axis. The diffraction pattern in the same plane as the laser beam contains information about the fiber diameter, concentricity and the coating thickness. As disclosed herein, out-of-plane scattering contains information about discontinuities in the medium (e.g. breaks and bubbles in the coating). The simple operating principle is believed to be that the point-like defects in the fiber buffer serve as sources for reradiation of the incident light. Light scattering from bubbles with diameters on the order of the wavelength of light is commonly called Mie sized scattering. Rayleigh scattering occurs when the scattering sites are very small compared to the wavelength of the incident beam. Mie scattering is highly directional forward scattering of light. Rayleigh scattering is isotropic. For a single Mie size bubble in a homogeneous material, the scattering should be into a cone around the forward direction. Hence, by monitoring the out-of-plane scattering, defects in the coating may be detected.

The simplified diagram of FIG. 1 illustrates the principles of the present invention. The system 10 includes a section of an optical fiber 11 under inspection which is vertically oriented with a vertical longitudinal axis "e" and a horizontal transverse axis "t". The fiber 11 extends through an aperture 12 in a dish 14. The dish 14 has first and second apertures 16 and 18 through which first and second orthogonal beams 20 and 22 from a laser (not shown) illuminate the fiber 11 at a point 'A' along the transverse axis thereof. As will be made more evident below, the invention is not limited to the number of laser beams or detectors shown in any of the illustrative embodiments. Those skilled in the art, with access to the present teachings will recognize that the principle of the invention can be extended to a configuration with any number of beams and detectors required or desired for adequate illumination of a fiber buffer under evaluation for any particular application.

The fiber 11 is pulled through the dish 14 so that each point along its length is illuminated by the beams 20 and 22. When there is no defect in the coating of the fiber at the point of illumination 'A', light from each beam is forward scattered onto a band 24 an the inner surface of the dish 14 which extends circumferentially around the fiber 11 in the transverse plane of the beams 20 and 22. While such 'in-plane' forward scattered rays 26 from the second beam 22 are shown, those from the first beam 20 are omitted for clarity in illustration. The in-plane forward scattered rays 26 impinge on the band 24 and generate an in-plane diffraction pattern 28 when no defects exist in the coating of the fiber 11 at the illumination point 'A'. When a defect exists in the coating of the fiber 11 at the illumination point 'A', additional rays 30 are scattered by the defect out of the transverse radial plane defined by the angular rotation of the first or second beam 20 or 22 about the fiber 11 at the point of intersection 'A' of the beam 20 or 22 with the fiber 11. This is illustrated in FIG. 2 which shows a representation of a portion of a typical optical fiber 11 with a defect 32 in the buffer coating 34. In this illustration, the defect is a nick which, at point A', has penetrated the coating 34 to the cladding 36 of the fiber 11. It should be understood that other defects such as bubbles will cause the out-of-plane scattering discussed herein. As the incident optical beam 20 illuminates the defect 32 at point 'A' along the transverse axis 't' of the fiber 11, a ray (or plurality of rays) 30 is scattered out of the radial transverse plane. As seen in FIG. 1, these rays 30 impinge on the inner surface of the dish 14 outside of the band 24 and generate an out-of-plane diffraction pattern 40. To the extent that the diffraction pattern 40 illuminates either the third or fourth apertures 42 and 44, an optical signal is picked up by optical detector fibers 46 and 48, respectively, and communicated to a detector 50, not shown in FIG. 1. The detector 50 provides an electrical signal in response to the optical signal which is amplified and recorded or displayed as an indication of defect detection.

It should be noted that for a given defect 32, out-of-plane scattering may be induced by the first or the second beam 20 or 22 depending upon the incident angle thereof. It should also be noted that while the magnitude of the scattered signal should be greatest at the maximum penetration of the defect 32 into the coating 34, some out-of-plane scattering should result from the portions of the defect above and below point 'A' in FIG. 2.

FIG. 3 shows a front view of the illustrative embodiment of the defect detection system 10 of the present invention. In this view the annular dish 14 is shown encased in a metal frame 52. The dish may be made of aluminum, plastic or other suitable material. In the preferred embodiment, the dish is aluminum with a coating of white paint with the exception of the band 24. In the preferred embodiment, a recess 25 is cut into the dish and painted black, at the band 24, to trap the in-plane scattered rays 26. In the preferred embodiment, the dish 14 includes an iris diaphragm 54 which closes around a teflon ring 56. The teflon ring 56 has a small aperture through which the fiber 11 passes. The recess 25, iris 54 and ring 56 serve to minimize the receipt of undesirable light by the detector fibers 46 and 48 and thereby serve to improve the signal-to-noise ratio of the system. The fibers 46 and 48 are encased within metal tubes 58 and 60 which extend through apertures 42 and 44 respectively in the dish 14. The tubes 58 and 60 serve to maintain the detector fibers 46 and 48 in proper position relative to the fiber 11. Ideally, the tubes 58 and 60 will maintain the detector fibers 46 and 48 pointed at the illumination point 'A' of the fiber.

FIG. 3 shows that the first and second beams 20 and 22 illuminate the fiber 11 and pass out of the dish 14 (or to suitable light traps not shown) via apertures 62 and 64 respectively. The beams 20 and 22 are provided by a commercial helium neon laser 66 via a 50—50 beamsplitter 68 and first and second mirrors 70 and 72 enclosed within the frame 52. As explained above in reference to FIG. 1, the out-of-plane scattered beams are picked-up by the detector fibers 46 and 48, which are bundled, and input to the optical detector 50.

Thus, a method for detecting defects in an optical fiber of the present invention includes the steps of: (a) illuminating an optical fiber with a collimated beam of electromagnetic energy and (b) detecting any scattering of the beam, from a defect in the fiber buffer, out of a radial plane defined by the angular rotation of the beam about the fiber at the point of intersection of the beam with the fiber.

FIG. 4 shows an alternative embodiment of the defect detection system 10' of the present invention. The alternative embodiment of FIG. 4 is identical to that of FIG. 3 with the exception that provision is made for three incident beams 20', 21', and 22' and six detector fibers 46'. For economy, the three incident beams 20', 21', and 22' are provided from a single laser 66' via a ⅓, ⅔ beamsplitter 80'. The ⅓, ⅔ beamsplitter 80' splits out a first beam 20' having an intensity equal to one third the incident beam and directs it to a first mirror 82'. A second beam equal in intensity to ⅔ the incident beam is transmitter to a 50—50 beamsplitter 84'. The 50—50 beamsplitter 84' reflects a second beam 21' to the fiber 11 and transmits a third beam to the fiber via mirrors 86' and 88'. Hence, three beams are provided which illuminate the fiber 11 at 120 degree angles relative to each other. The plural beams and detectors serve to optimize defect detection. Those skilled in the art will recognize additional configurations which may be optimal within any specifications for a particular application.

FIG. 5 illustrates yet another alternative embodiment of the invention. In FIG. 5, the dish 14 of FIG. 1 is shown in a sectional side view. In this embodiment, an auxiliary detector 100 is included to provide some measure of the total energy scattered out-of-plane. This detector 100 facilitates the measurement of defects in glossy fibers which might otherwise cause a low level (or zero level) of detection by one of the detector fibers 46 or 48. In this embodiment, the output of the auxiliary detector 100 is separately recorded and monitored for comparison to the outputs of the fiber detectors.

FIG. 6 shows an illustrative complete optical fiber inspection system 200 utilizing the principles of the present invention. The inspection system 200 includes the optical fiber defect detection system 10 covered in front by a protective hood 210. A conventional diameter monitor 220 is connected to the rear of the defect detection system 10. Optical fiber is provided by a spool 222 via first and second reels 224 and 226 to the defect detection system 10. A diameter monitor 220 is provided for use in conjunction with the defect detections system 10. The fiber is taken up by a second spool 228 via another set of reels 230 and 232. Coating defects are detected in the manner described above by the system 10 of the present invention and input to a chart recorder 240. A general purpose computer 250 is provided to control the activation of the spools 222 and 228 via motors (not shown). A monitor 252 and keyboard 254 are provided for interfacing with the computer 250. Optional equipment such as a video recorder (VCR) 260 which would operate with optional camera 270 to record an image of the scattering from any defect detected. Also provided are an optional diameter meter 280, time generator 290 and counter 300. It is understood that the peripheral equipment i.e., the chart recorder 240, camera 270 and VCR 260, and diameter 280 could be either under the control of or in communication with the computer 250. The entire system 200 may be enclosed within a console 400.

Thus, the present invention has been described with reference to illustrative embodiments for a particular application. Those skilled in the art, having access to the present teachings, will recognize additional modifications, applications and embodiments within the scope thereof. For example, as mentioned above, the invention is not limited to the number of laser beams or detectors shown in any of the illustrative embodiments. Those skilled in the art, with access to the present teachings will recognize that the principle of the invention can be extended to a configuration with any number of beams and detectors required or desired for a particular application.

It is intended by the appended claims to cover any and all such applications, modifications and embodiments within the scope of the invention.

Accordingly, what is claimed is:

1. An optic fiber buffer defect detection system comprising:
    means for illuminating a first optical fiber with a collimated beam for electromagnetic energy along a transverse axis thereof, said transverse axis being substantially orthogonal to the longitudinal axis of said fiber;
    means for detecting any scattering of said beam, from a defect in said fiber, out of a radial plane defined by the angular rotation of said beam about said fiber at the point of intersection of said beam with said fiber; and
    retaining means for retaining and illuminating means and said detecting means relative to said fiber, said retaining means including a dish, mounted in a plane substantially parallel with said transverse axis, having a first aperture at the radial center thereof for receiving said fiber and an iris diaphragm mounted in said first aperture for substantially closing around said first optical fiber.

2. The defect detection system of claim 1 wherein said detecting means includes an optical detector.

3. The defect detection system of claim 2 wherein said detecting means includes a fiber optic in optical communication with said detector for transmitting said scattered energy to said detector.

4. The defect detection system of claim 1 wherein said dish has a second aperture for passing said beam to said fiber.

5. The defect detection system of claim 4 including detector fiber means for communicating said scattered energy to said detecting means.

6. The defect detection system of claim 5 wherein said detector fiber means includes a second optical fiber.

7. The defect detection system of claim 6 wherein said detector fiber means includes a tube for retaining said second optical fiber.

8. The defect detection system of claim 7 wherein said dish has a third aperture for retaining said tube.

9. The defect detection system of claim 1 said means for illuminating said first optical fiber includes means for providing plural electromagnetic beams for illuminating said first optical fiber.

10. The defect detection system of claim 1 wherein said detector means includes plural means for detecting energy scattered from said defect.

11. The defect detection system of claim 10 wherein said plural means for detecting energy scattered from said defect includes a first and second optical detector mounted external to said dish.

12. The defect detection system of claim 1 including means for transporting said first optical fiber through said aperture in said dish.

13. The defect detection system of claim 12 wherein said transporting means includes means for controlling the activation thereof.

14. The defect detection system of claim 1 including means for recording the output of said detecting means.

15. The defect detection system of claim 1 wherein said dish has an annular recess along an inner surface thereof at the point of intersection of said radial plane therewith for receiving any scattering of energy from said beam in said radial plane.

16. The defect detection system of claim 15 wherein said recess in said dish is painted to inhibit scattering of energy therefrom.

* * * * *